United States Patent [19]
Guth

[11] 3,771,188
[45] Nov. 13, 1973

[54] APPARATUS FOR MELTING FROZEN MATERIAL AND DISPENSING A MELTING AID

[75] Inventor: Raymond J. Guth, Rochester, N.Y.
[73] Assignee: Robert T. Shaw, Rochester, N.Y.; a part interest
[22] Filed: June 28, 1971
[21] Appl. No.: 157,454

[52] U.S. Cl................ 15/105, 37/16, 219/201, 401/137
[51] Int. Cl....... E01h 5/10, E01h 5/12, E01h 10/00
[58] Field of Search........................... 15/105, 111; 219/201, 243; 401/139, 137, 1, 2; 37/16

[56] References Cited
UNITED STATES PATENTS

| | | | |
|---|---|---|---|
| 2,997,796 | 8/1961 | Pogue et al.................... | 37/16 |
| 2,699,614 | 1/1955 | Welch............................ | 219/201 |
| 1,033,222 | 7/1912 | Whitehead.................... | 401/137 |

Primary Examiner—Leon G. Machlin
Attorney—Dennis M. De Leo

[57] ABSTRACT

Apparatus including a hopper—itself including a bottom wall, side walls intersecting or merging with each other and with the bottom wall and an openable (i.e., removable or able to open by pivoting about a hinge or the like) top cover substantially contiguous to the side walls, the bottom wall having therein a dispensing means (e.g., a regulatable opening) adapted to conduct the hopper's contents (a melting aid, for example) to the exterior thereof—as well as at least one heating plate attached, e.g., hingedly, along one of its edges to a side wall of the hopper so that it can be edgewise contacted against a frozen material to melt it in the contact region, is useful in promoting the melting of frozen material, ice, for example, and removing such frozen material from a surface such as a roof. Additionally, such apparatus can include a handle means and a means to dislodge frozen material, such as a blade or a brush. Preferably, the handle and dislodging means are removably mounted on the hopper. Preferably, the heating plates are electrically operated, and the apparatus can include means, such as a switch and or rheostat, to regulate the heating plates. Additionally, the apparatus can include a means to regulate the dispensing means from the handle.

8 Claims, 3 Drawing Figures

PATENTED NOV 13 1973 3,771,188

INVENTOR
RAYMOND J. GUTH

APPARATUS FOR MELTING FROZEN MATERIAL AND DISPENSING A MELTING AID

This invention relates to the melting of frozen materials, ice, for example, and more particularly, to apparatus for facilitating such melting of frozen materials and for promoting their removal from a surface.

A continuing problem in geographical regions experiencing temperatures below the freezing point of water and especially in those regions where in ambient temperatures typically cycle between values above and below the freezing point of water, is damage caused by ice formation and water trapped by such ice. A particularly serious type of damage is that suffered by articles of construction, including buildings, concrete paths on driveways, etc.

It is well known that the density of water is greatest at a temperature slightly above its freezing point, approximately 40°C, and that as water is cooled further, it therefore expands. It is also well known that as water solidifies into ice at its freezing point, the expansion is accentuated such that extreme forces are applied against surfaces that substantially enclose water as it freezes. As an example, one can cite glass bottles or metal containers holding water or aqueous solutions or suspensions, beverage containers, for instance. As the liquid contents freeze, flow is inhibited and the gradually solidifying contents exert an increasing force on the container until it shatters or distorts. The same phenomenon characterizes roadways, driveways and other structural bodies that can substantially enclose volumes of standing water or aqueous solution.

In another aspect, the formation of ice or the like frozen material can create a barrier behind which additional standing liquid is held. Each year, the formation of such "ice dams" causes significant water damage to buildings, and especially residential structures having shingle covered roof construction.

Generally, roof construction includes one or more sloping surfaces having underlying structural elements covered with overlapping layers of shingles. The lowermost portion of the roof surface generally extends beyond the building's exterior wall to prevent drainage of water or the like down along the exterior wall. Water damage results when the roof surface extending beyond the building's walls is at a temperature below the freezing point of water and the roof surface covering the area enclosed by the building's walls is above this freezing point. Then, snow or the like which contacts the roof at a point above the freezing point tends to melt, and the resulting water runs down the roof until it reaches the portion that is below its freezing point whereupon it resolidifies and forms an ice deposit. This ice deposit continues to grow as it is fed by more water running down the roof, and as the ice dam grows, standing water tends to become trapped behind it over the warmer portion of the roof. As the pool of water becomes deeper, it penetrates between the shingles and enters the building proper where significant damage to ceilings, walls, woodwork and the like often results. Such damage is generally most severe where ambient external temperatures cycle across the freezing point, since the melting and freezing sequence is hastened.

It is known that ice damage or the like can be prevented or minimized by either inhibiting the formation of frozen material or effecting its removal prior to occurance of any damage. Methods suggested for ice prevention or removal include such measures as applying a melting aid to the frozen material and lower the effective melting point to a value below the ambient temperature. This then promotes general melting of frozen material. While this is effective for snow or very thin ice formations, the melting aid generally becomes too dilute to operate effectively on the more massive ice deposits that typically cause damage. As such, melting aids are generally used only on roadways to improve winter driving conditions.

The direct application of an open flame is another method often described to achieve general melting of an ice deposit. This, however, has several inherent limitations. Firstly, the use of an open flame is extremely dangerous when the ice is present on flammable or heat damageable materials. Secondly, if the water formed on heating is unable to escape, it is likely that after removal of the heat source, ice will again form and cause further damage.

Yet another method of inhibiting undesired ice formation is to systematically heat a surface either overall or in a predetermined configuration. This can be done by use of substantially contiguous heat pipes or electrically heated cables including resistance elements. In the case of heat pipes, cost is often prohibitive and they present a cumbersome structure. With electrically heated cables, the arrangement is generally established prior to ice formation, and it is difficult to effect changes in orientation after ice has formed. As such, heating cables are not generally portable and hence, not able to be used for ice formations present in areas not bearing a pre-existing arrangement of heating cables. Also, since the heat cables are generally of narrow cross section and depend largely on conduction for their effectiveness, they can prove an inadequate measure where a significant buildup occurs prior to activating the heating cables.

Accordingly, it would be desirable to provide apparatus that is capable of removing a frozen material like ice, is portable and convenient to use, is capable of being used with great safety and is susceptible of effective use even in the presence of a thick ice buildup.

Accordingly, it is an object of this invention to provide new apparatus for dispesning a melting aid, e.g., an ice melting aid, and removing frozen material from a surface.

It is another object of this invention to provide novel apparatus for removing frozen material from a surface, the apparatus including a dispensing means and a contact heating means such as a heating plate.

These and other objects of the present invention will become increasingly apparent from a reading of the following specification and amended claims.

In accordance with the present invention, there is provided composite apparatus for dispensing a melting aid and removing frozen material from a surface, the apparatus including:

a. a hopper or container itself including:
1. a bottom (also termed bottom wall), and
2. one or more side walls, each including an upper edge and a lower edge which meet or otherwise intersect other, e.g., adjacent, side walls and the bottom wall along said slower edge(s),
3. optionally, an openable top cover or top wall to define the hopper (e.g., a hollow container whose bottom wall, side wall(s) and top wall can define—along lines of intersection—forms such as a parallelpiped wherein all angles are preferably right angles, a cylinder or cylinder trucated along a plane substantially parallel with its long axis, a triangular prism, etc, and 4. in the bottom wall, a dispensing means adapted to conduct contents of the hopper to the exterior thereof, b. at least one heating plate hingedly attached along an edge thereof to a side wall of the hopper such that the plate can be contacted edgewise against a frozen material, e.g., ice, to melt the frozen material in the region of contact. The heating plate(s) or the hopper side wall(s) against which such plate(s) can be mounted can incorporate suitable thermal insulationg, e.g., a silicone or asbestos spacer, so that heat from the plates will not damage the hopper in the event that a heated plate is brought into proximity to the hopper side walls.

In addition to the above components, the apparatus of this invention can also include a handle means, including telescoping handles, preferably demountably mounted on a side wall of the hopper and most preferably on the same side as the heating plate or plates. Still further, the present apparatus can include a means to dislodge or otherwise assist in the removal of frozen material from a surface. Preferably, such means is demountably or removably mounted (e.g., by dovetail, clips, snaps, etc,) on the bottom wall of the hopper. Exemplary dislodging means include brush means like wire brushes, bristle brushes or scraper means such as metal scraper blades, plastic blades, etc.

The heating plate or plates are preferably electrically operated such as by having resistance heating wires, strips or other elements embedded or otherwise encased or enclosed therein. It will be understood that the electrically operated heating plates are electrically connected by well-known means such as wires, etc, to a source of electrical energy, a battery, commercial electrical power or the like. Additionally, it is understood that appropriate connectors such as electrical plugs, socket, switches and/or rheostats can be used to interrupt or regulate the heating of the plates described herein.

The hopper provides a receptacle for retention of melting aid (salt crystal proprietary melting aids, etc,) until it is desired to deposit said melting aid on a frozen material to be melted. The openable top cover facilitates loading of the hopper and prevents spillage of melting aid contained in the hopper.

The dispensing means in the bottom wall of the hopper can be any means suitable to conduct melting aid from the interior of the hopper to the exterior thereof for deposition on frozen material. Suitable dispensing means can be regulatable or non-regulatable. Exemplary dispensing means include slots, either completely open or covered with grids or hinged or sliding closures for regulation of the dispensing action. The hopper can be fabricated from a wide variety of suitable materials, metals and plastics being preferred. It is also desirable that the handle and other portions of the apparatus, e.g., the openable top cover, etc, are fabricated from an electrically insulating material. Additionally, linkages and other apparatus to connect the dispensing means and or the heating plates so that they can be operatively engaged, disengaged or regulated from the handle region held by or readily accessible to an operator.

The above and other features and objects of the present invention will be increasingly apparent having reference to the following specification taken in conjuction with the accompanying drawing in which.

Figure 1:
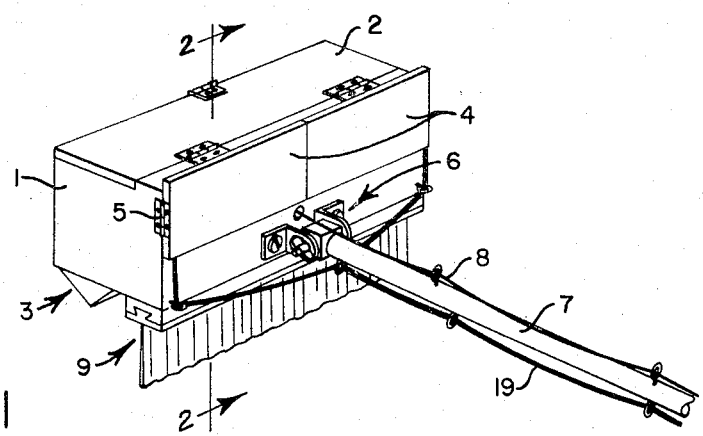
FIG. 1 is a rear perspective view of one embodiment of the novel apparatus.

Referring now to the drawing, wherein like numbers indicate similar parts, the apparatus for melting frozen material and dispensing a melting aid, as illustrated in FIG. 1 includes a hopper 1 (itself including a bottom wall and side walls) having an openable top cover 2 and, integral to the bottom wall of the hopper, a dispensing means 3. Heating plates 4 are attached to a side wall of the hopper through hinge means 5. Also attached to the same side wall as said heating plates is a handle mount 6 to which a handle 7 can be rotatably, demountably or removably mounted. Also included is a linkage means 8 (such as a wire, line or cord) to regulate dispensing aation of the dispensing means, and a demountably or removably mounted means 9, such as a brush, to assist in removing frozen material from a surface. Also included in FIG. 1, and similar to wire 8, but located in part on the underside of handle 7 are electrical wires 19 to connect the heating plates 4 to an external source of electrical power (not shown).

Figure 2:
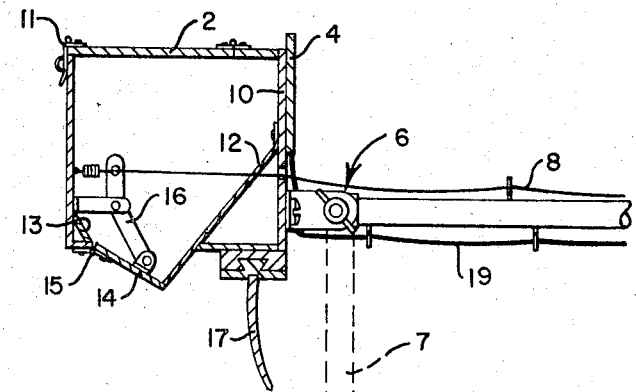
FIG. 2 is a sectional view of said embodiment of the apparatus taken along line 2—2 of FIG. 1 looking in the direction of the arrows.
Figure 3:
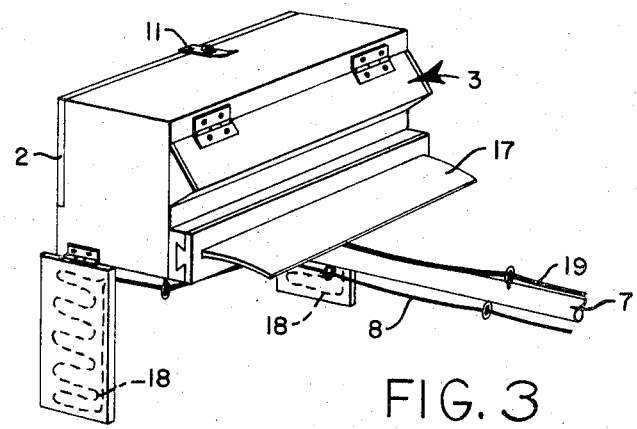
FIG. 3 is a bottom perspective view of said embodiment of the apparatus.

Referring now to FIG. 2, the hopper is shown in section, including the top cover 2 and heating plate 4. Also indicated are the handle mount 6, handle 7 (shown in phantom rotated to a lowered position such as is indicated in FIG. 3), dispensing means control linkage 8 and heating plate electrical wire(s) 19. Further illustrated is the hopper side wall carrying the heating plates 4 as well as additional components including the top cover latch 11 and details of the dispensing means like inner walls of the hopper 12 and 13 that are inwardly, downwardly inclined to direct contents of the hopper towards the exit provided by the dispensing means. Contiguous to the lowermost edges of said inner walls 12 and 13 and sealing the hopper lower regions is a dispensing gate or flap 14 that is openable along hinge(s) 15 when linkage 8 is tensed to activate gate 14 by bellcrank apparatus 16 which is spring loaded to hold gate 14 in the closed position when linkage 8 is not tensed or pulled. It will be appreciated that by varying the tension on linkage 8, the rate of dispensing contents of the hopper via gate 14 can be regulated within the minimum and maximum possible rates at the discretion of an operator. Also shown is a scraper means 17 to assist in removal of frozen material.

As shown in FIG. 3, the apparatus of FIG. 1 is shown in a bottom perspective view indicating the handle 7 rotated to the position shown in phantom in FIG. 2. Also shown is the openable top cover 2 in a closed position and held in such position by latch 11. Dispensing means 3 is also illustrated as is the dispensing means control linkage 8 and demountably mounted scraper 17 (which can be interchanged with such other means as the brush means 9 as shown in FIG. 1). In FIG. 3, heating plates 4 are shown in the opened position and they contain encased electrical resistance heating wires 18 (phantom). These wires are, of course, electrically connected to a power supply by other suitable cables, wires or the like. It will be appreciated that the heating plates can be maintained in the open position by any number of suitable techniques including, for example, spring biased hinges, detents, linkages or the like. Additionally, if desirable, thermally insulating spacers or rests can be positioned on the side wall which is adjacent to the heating plates when they are in the closed position so that, in the event that such plates are at a temperature that could be deliteriously affect the hopper material, damage will be prevented.

It will be understood further than the heating plates are desirably connected to an electrical power source via suitable connecting wires, plugs, receptacles, switches and or rheostats. By the use of a rheostat, the temperature of the heating plates can be varied to compensate for such items as varying ambient temperatures, varying volumes of frozen material for removal, etc. It is thought that the heating plates should be maintained at a temperature (when being used to effect melting) of at least about 100° F, and further, that they should be capable of attaining temperatures of about 180° to 200° F and higher for efficient melting under particularly adverse circumstances.

While a particular embodiment of this invention is shown, modifications thereof will occur to those skilled in this art. The invention has been described in detail with particular reference to certain preferred embodiments thereof, but it will be understood that variations and modifications can be effected within the spirit and scope of the invention.

There is claimed:

1. Composite apparatus for dispensing a melting aid and removing ice from surfaces, including roof surfaces, the apparatus comprising:
   a. a hopper comprising a bottom wall, side walls, and an openable top cover substantially contiguous to to the side walls, the bottom wall having therein a dispensing means adapted to conduct contents of the hopper to the exterior thereof,
   b. at least two heating plates hingedly attached along an edge thereof to a side wall of hopper such that the plates can be contacted edgewise against the ice to melt it in regions of contact, and
   c. a handle means demountably rotatably mounted on the same side wall of the hopper as said heating plates.

2. Apparatus as described in claim 1 and additionally including a means to dislodge ice from a surface, said ice dislodging means being removably mounted on the bottom wall of the hopper.

3. Apparatus as described in claim 2 wherein the dislodging means comprises a blade member.

4. Apparatus as described in claim 2 wherein the dislodging means comprises a brush means.

5. Composite apparatus for dispensing a melting aid and removing ice from a surface, including roof surfaces, the apparatus comprising:
   a. a hopper comprising a bottom wall, said walls, and an openable top cover substantially contiguous to the side walls, the bottom wall having therein a regulatable dispensing means adapted to conduct contents of the hopper to the exterior thereof,
   b. at least two electrical heating plates hingedly attached along an edge thereof to a side wall of the hopper such that the plates can be contacted edgewise against the ice to melt it in regions of contact,
   c. a handle means demountably, rotatably mounted on a the same side wall of the hopper as said heating plates, and
   d. a means to dislodge ice from a surface, said ice dislodging means being removably mounted on the bottom wall of the hopper.

6. Apparatus as described in claim 5, and further including a means to regulate the dispensing means from the handle means.

7. Apparatus as described in claim 5 wherein the dislodging means comprises a blade means.

8. Apparatus as described in claim 5 wherein the dislodging means comprises a brush means.

* * * * *